(No Model.)
E. SWARTWOUT.
SWINGING PLANT STAND.
No. 342,476. Patented May 25, 1886.
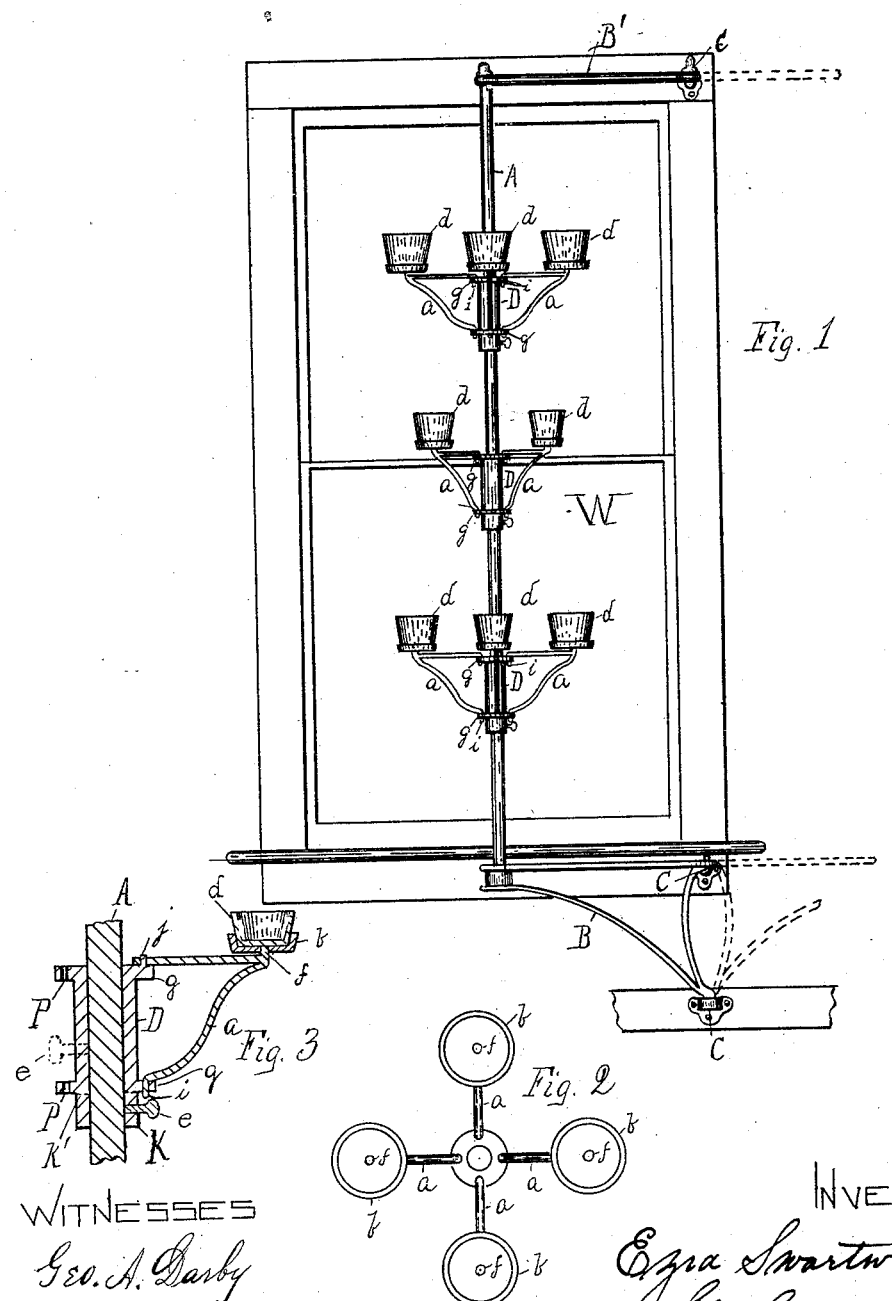

UNITED STATES PATENT OFFICE.

EZRA SWARTWOUT, OF MECHANICSVILLE, NEW YORK.

SWINGING PLANT-STAND.

SPECIFICATION forming part of Letters Patent No. 342,476, dated May 25, 1886.

Application filed February 13, 1886. Serial No. 191,795. (No model.)

*To all whom it may concern:*

Be it known that I, EZRA SWARTWOUT, a resident of Mechanicsville, in the county of Saratoga and State of New York, have invented certain new and useful Improvements in Swinging Plant-Stands; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in swinging plant-stands, the object of the invention being fully explained in the following specification.

The invention consists of the novel construction and arrangement of parts, hereinafter fully explained, and pointed out in the claims.

Figure 1 of the drawings is a front elevation of my improved stand swung into a house-window. Fig. 2 is a plan view of one of the plant-holding sections and attachments removed from its supporting-standard. Fig. 3 is a vertical section of a portion of the device, hereinafter fully explained.

I employ a swing-frame, made up of the standard A and supporting-brackets B and B', hinged upon fixtures C, secured to the window-casing or other suitable support, whereby the frame may be swung into the window W, as shown, or back against the house-wall. The tubular sections D are fitted to slide vertically upon the standard A, and are provided with end flanges, $g$, having perforations P, adapted to receive the ends $i$ of the hinge-brackets $a$; or the ends of the brackets may be perforated to receive lugs $j$, projecting upward from the flanges, as shown in Fig. 3. The sections D are also provided with a projecting collar, K, having a threaded aperture adapted to receive the set-screw $e$, by which the sliding section may be secured at any desired elevation upon the standard; or the collar may be wholly separate and cut off from section D, as shown by the dotted line K' in Fig. 3. The brackets $a$ are provided at their projecting ends with a pivot, $f$, adapted to receive the circular plate or disk $b$, having a central aperture adapted to receive the pivot. The disk $b$ is adapted to hold and support a plant-pot, $d$. It will thus be seen that I am able to place several sections D, one above another, upon the same standard A, and that each section may have a sufficient number of hinged brackets, $a$, to form a complete circle of pot-supporting disks around the standard, and that the whole frame, including pot-supports, may be swung to and from the window, which is of very great importance, as the plants may be left in the window during the day, or while the sun is shining therein, and easily swung back from the window during cold nights when they would be exposed to frost if left in the window, as is the case with stationary stands. The sections can also be adjusted vertically with little difficulty, whereby the plants as they grow to different heights may be given sufficient room between the sections. While the plants are young and short they require less room, and a larger number of sections may be employed; but as they grow in height some of the sections are emptied of their plants and may be moved up or down upon the standard out of the way of the growing plants. When the plants are removed and a particular section is not needed for supporting plants, the brackets $a$ and their supporting-disks $b$ can be easily removed, as it is only necessary to slip the brackets from their hinges, by which they are connected to the sections D. By having the brackets $a$ hinged upon sections D, the brackets will swing to their proper places to support a complete circle around the standard of pots of various sizes. The set-screw may be situated in the body of the sliding section, as shown by the dotted line in Fig. 3.

The stand can be easily swung out of the window at any time to permit of free access to the window for any purpose, either to open the window and arrange the outside blinds, or to operate the inside blinds or window-curtain, and secure an unobstructed view through the window.

What I claim as new, and desire to secure by Letters Patent, is—

In window-stands for plants, the combination, with the fixtures or sockets C, of the swing-frame consisting of standard A, brackets B B', pivoted in said sockets, the tubular sections D, vertically adjustable on said standard and having flanges $g$, the brackets $a$, hinged to said flanges, and the disks $b$, carried by said brackets $a$, all substantially as shown and described.

In testimony whereof I have hereunto set my hand this 28th day of January, 1886.

EZRA SWARTWOUT.

Witnesses:
  GEO. A. MOSHER,
  W. H. HOLLISTER, Jr.